United States Patent [19]

Safiuddin et al.

[11] 3,814,310

[45] June 4, 1974

[54] STATIC INERTIA COMPENSATION FUNCTION GENERATOR

[75] Inventors: Mohammed Safiuddin, North Tonawanda, N.Y.; Gary L. Morrison, Monroeville, Pa.

[73] Assignee: Westinghouse Electric Corporation, Pittsburgh, Pa.

[22] Filed: Nov. 29, 1972

[21] Appl. No.: 310,515

[52] U.S. Cl. .................................... 235/197, 318/6

[51] Int. Cl. ......................... G06g 7/26, B65h 59/38

[58] Field of Search ................. 235/197, 151, 151.1; 318/6, 7; 112/254; 114/213; 242/45, 75; 254/172, 173 B

[56] References Cited

UNITED STATES PATENTS

| | | | |
|---|---|---|---|
| 3,189,804 | 6/1965 | Dolphin et al. | 318/6 |
| 3,411,055 | 11/1968 | Carter et al. | 318/6 |
| 3,448,357 | 6/1969 | Dolphin | 318/6 |
| 3,548,270 | 12/1970 | Silva | 318/6 |
| 3,704,400 | 11/1972 | Goshima et al. | 318/6 |

*Primary Examiner*—Joseph F. Ruggiero
*Attorney, Agent, or Firm*—J. J. Wood

[57] ABSTRACT

This disclosure relates to a static inertia compensation function generator for use in a constant tension control system for a d.c. drive motor operating to wind or unwind a reel of material. A first generator develops a signal $\overline{D}$ which is a function of the normalized instantaneous diameter of the reel. A second generator receives the signal $\overline{D}$ and generates a signal $-\alpha_1 K_1 \overline{D}^2$ which is a function of the square of the normalized instantaneous diameter, $\alpha_1$ and $K_1$ being constants. An inverter also receives the $\overline{D}$ signal and delivers an inverted normalized instantaneous diameter signal $-\overline{D}$. A third generator receives the inverted signal $-\overline{D}$ and develops a signal, $1/\overline{D}^2$ which is a function of the normalized instantaneous diameter squared. A summation amplifier receives the two signals: $-\alpha_1 K_1 \overline{D}^2$ and $1/\overline{D}^2$ and delivers an amplified inertia compensation signal $Iac = \alpha_2(\alpha_1 K_1 \overline{D}_2 + [1/\overline{D}^2]$ where $\alpha_2$ is the gain of the amplifier. The inertia compensation signal $Iac$ is additive or subtractive from a current reference I and is used for accelerating or decelerating the d.c. motor for the purpose of maintaining constant tension on the material under dynamically varying load conditions.

4 Claims, 11 Drawing Figures

STATIC INERTIA COMPENSATION FUNCTION GENERATOR

BACKGROUND OF THE INVENTION

1. Field of the Invention

This invention relates to a static inertia compensation function generator for supplying inertia compensation signals for varying the speed of a d.c. drive motor operating to wind or unwind a reel of material, for the purpose of maintaining constant tension in the material under dynamically changing load conditions.

2. Discussion of the Prior Art

In many process lines it is of paramount importance that the material being processed be maintained under constant tension. In the operation of metal reduction rolling mills and the like, reel strip tension is normally required to be held at a predetermined substantially constant magnitude in order to minimize gauge disturbances and insure proper rolling mill operation. With current regulated drives, a current reference I is made proportional to either D/Φ or K (S/CEMF) where D = coil diameter
Φ = the drive motor flux
S = the speed of the material
K = a constant
CEMF = the counter electromotive force.

These considerations supra are valid only when the mill is operating at a constant speed. During acceleration or deceleration an added torque must be provided by the reel motor in order to accelerate the combined inertias of the mandril, rotor gearing and the coil.

In order for the tension on the material to remain constant during changes in mill speed, the added torque requirements must be anticipated and forced on the reel motor by feeding an extra signal (I*ac*) to the reel motor. This signal Iac will sum with the reference I, causing the armature current to increase during acceleration of a rewind reel, and to decrease during deceleration. For a payoff reel the current will decrease during acceleration and will increase during deceleration.

These considerations are in the prior art and are described in an article entitled "New Developments in Rolling Mill Regulator Systems" by A. V. Silva in Iron and Steel Engineer September 1970. U.S. Pat. No. 3,548,270 to A. V. Silva for "Maximum Torque Reel Drive Utilizing an Inertia Compensation and counter EMF Control" describes the generation of an inertia compensation signal.

The patent to Silva supra utilizes motor operated rheostats for generating the various components which make up the inertia compensation signal. These moving parts require empirical adjustments in the field set up in order to obtain the correct relationships — this frequently can be time consuming.

The instant invention provides a static inertia compensation function generator on a single card which may be set in operation in a fraction of the time previously required, and is versatile enough so that it may be adjusted for a new application simply by means of changing jumper connections.

SUMMARY OF THE INVENTION

In a constant tension control system for a d.c. motor operating to wind or unwind a reel of material, a static inertia function generator is provided in accordance with the invention for supplying inertial compensation signals, Iac for varying the speed of the d.c. motor for maintaining constant tension on said material during accelerating or decelerating load requirements. Means are provided for generating a signal $\bar{D}$ which is a function of the normalized instantaneous diameter of said reel. Means are provided for receiving the signal $\bar{D}$ and for generating a signal $-\alpha_1 K_1 \bar{D}^2$ which is a function of the square of said normalized instantaneous diameter, $\alpha_1$ and $K_1$ being gain constants. The signal $\bar{D}$ is also received by means which deliver an inverted normalized instantaneous diameter signal $-\bar{D}$. Means receive the inverted signal $-\bar{D}$, and deliver a signal $1/\bar{D}^2$ which is a function of the reciprocal of the normalized instantaneous diameter squared. Means receive the signals $-\alpha_1 K_1 \bar{D}^2$ and $1/\bar{D}^2$ for amplification and summation, said latter means then delivering said inertia compensation signal $Iac = \alpha_2(\alpha_1 K_1 \bar{D}^2)$ where $\alpha_2$ is the gain off said amplification summation means.

DESCRIPTION OF AN EXEMPLARY EMBODIMENT

Figure 1:
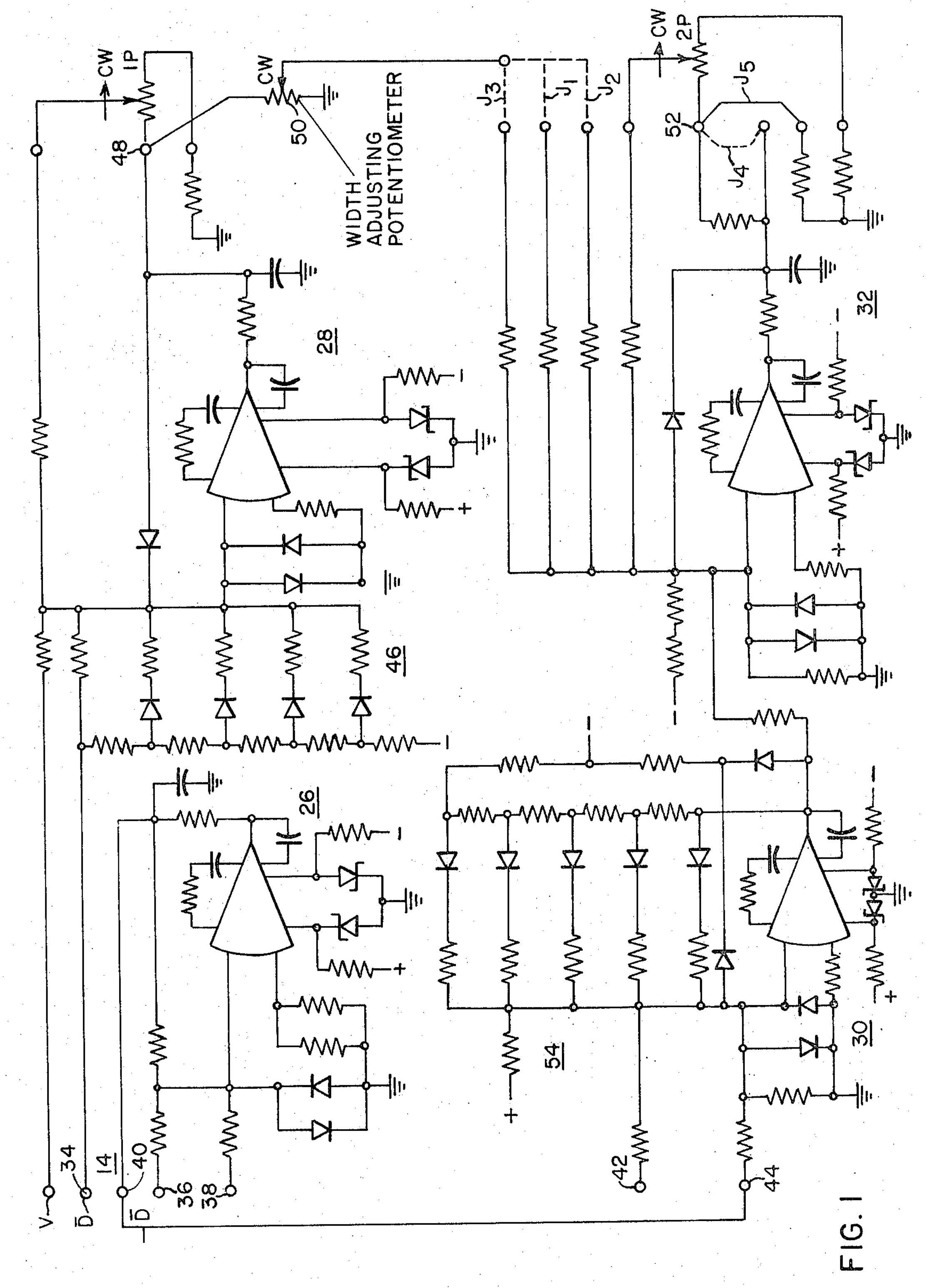
FIG. 1 is an electrical schematic of the static inertia compensation function generator in accordance with the invention.
Figure 2:
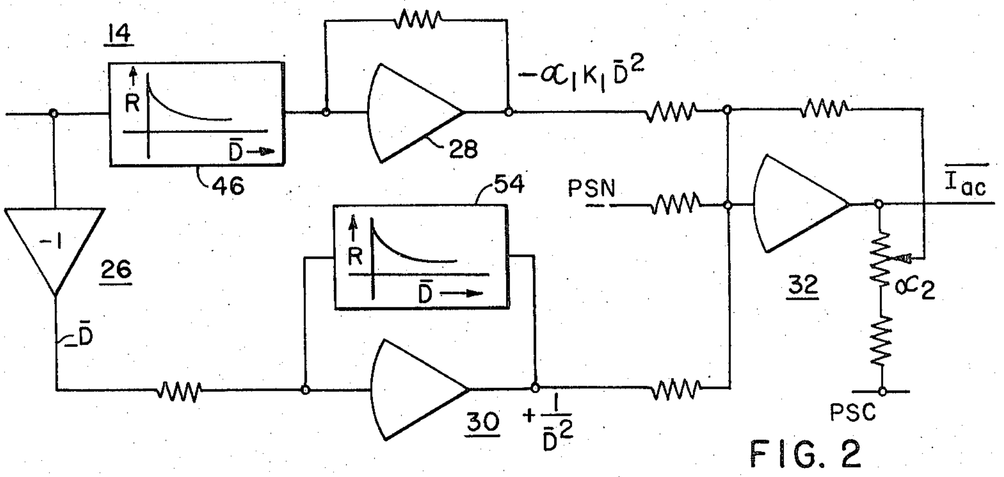
FIG. 2 is a simplified functional diagram of the main components of the invention depicted in FIG. 1.

In a typical process line, a pay out reel unwinds the material to be processed, while at the other end the finished material is wound on a take-up reel. Obviously, the mass on one reel is decreasing, while the mass on the other reel is increasing. In order to satiate these opposed requirements the drive motor for each reel is provided with a separate regulatory system such as depicted in FIGS. 1 and 2.

Figure 4:
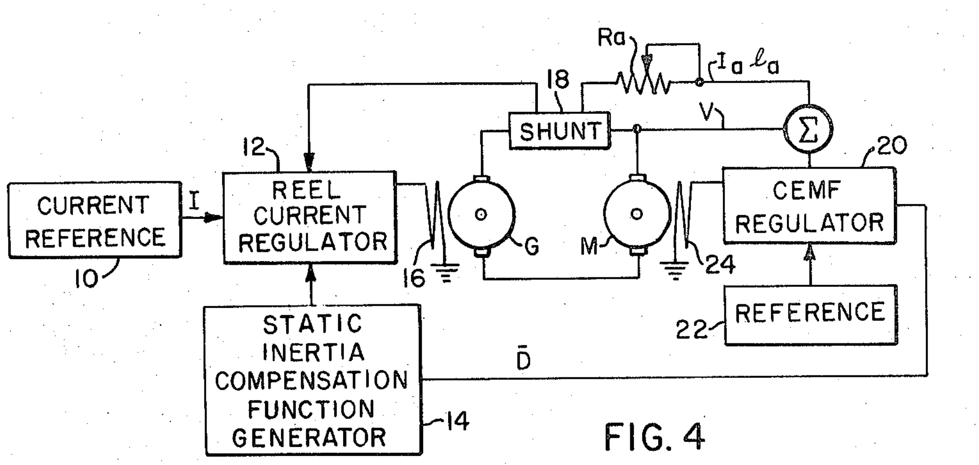
FIG. 4 is an electrical schematic of a constant tension control system, illustrating the overall environmental setting of the invention, and depicting the role of the static inertial compensation function generator as part of this system.

Referring now to FIG. 4, a current reference 10 supplies a fixed current signal I to the reel current regulator 12. The static analog inertia compensation function generator 14 supplies a variable inertia compensation signal *Iac* which adds to or subtracts from the fixed reference current signal I. The output from the reel current regulator 12 energizes the field 16 of a generator G which drives a reel motor M. The armature current of the motor M is monitored by means of a shunt 18 which provides negative feedback to the reel current regulator 12. The shunt 18 is also connected to an adjustable resistor R*a* the magnitude of which is a function of the armature resistance of the motor M, the purpose of which is to provide a voltage IaRa to the summing junction. A second input to the summing junction, is the generator voltage V which is of opposite polarity to the voltage I*a*R*a*. The summation of these two inputs provides an output from the summing junction equal to the counter electromotive force ($CEMF = V - IaRa$). The CEMF signal is applied to a CEMF regulator 20. A second input to the CEMF regulator 20 is a voltage of opposite polarity supplied by a reference signal source 22. The output from the CEMF regulator 20 controls the current through the field 24 of the motor M. During normal operation the CEMF regulator 20 is saturated and the field 24 of the motor M is held at full field strength. However, should the motor speed be in excess of the operating speed at full field, the CEMF signal will then operate to override the reference signal and weaken the field strength of field 24 to permit higher speeds without damage to the equipment. The CEMF regulator 20 also sends a signal which is a function of $\overline{D}$ (the instantaneous normalized diameter of the coil), to the static inertia compensation function generator 14. The current signal Iac supplied by the static inertia compensation function generator 14 is non-linear. The practical embodiment for realizing this complex wave shape which must be generated is shown in the electrical schematic of FIG. 1. However, before describing the function generator 14, a better understanding of the complex requirements may be had by a consideration of the mathematics to follow.

MATHEMATICAL BACKGROUND

The torque required to accelerate a rotating mass having an inertia J can be expressed as follows:

$$T_{ac} = J\,(d\omega/dt) \tag{1}$$

where $T_{ac}$ = acceleration/deceleration torque $J$ = moment of inertia $\omega$ = speed in radians/sec.

The motor current required to produce this torque is given by, $$T_{ac} = K'_T \Phi_M\, Iac \tag{2}$$

$K'_T$ = a constant ft-lb/ampere-maxwell where $\Phi_M$ = motor flux in maxwells $Iac$ = motor armature current in amps Equating Eqs 1 and Eq 2

$$K_T\, \Phi_M\, I_{ac} = J(d\omega/dt) \tag{3}$$

Let $T_R$ = the rated torque $\omega_R$ = rated speed in radians/sec $\Phi_R$ = rated motor flux in maxwells $I_R$ = rated motor armature current in amps.

At rated flux and armature current the torque would be:

$$T_R = K'_T\, \Phi_R\, I_R \tag{4}$$

Normalizing equation 3 by dividing $K_T\, \Phi_R\, I_R$:

$$K'_T\, \Phi_M\, I_{ac}/K_T\, \Phi_R\, I_R = (J/K'_T\, \Phi_R\, I_R)\cdot(d\omega/dt) \tag{5}$$

$$\Phi M\, I_{ac}/\Phi R\, I_R = (J/K'_T\, \Phi R\, I_R)\cdot(\omega_R/\omega_R)\cdot(d\omega/dt). \tag{6}$$

Let the normalized magnitudes of flux, armature current, and speed be indicated by a bar over the symbol.

$$\overline{\Phi M} = \Phi M/\Phi R \tag{7}$$

$$\overline{Iac} = Iac/I_R \tag{8}$$

$$\overline{\omega} = \omega/\omega_R \tag{9}$$

$$d\overline{\omega}/dt = (1/\omega_R)\,(d\omega/dt) \tag{10}$$

Substituting in equation 6 the normalized magnitudes, and letting $K_T = K'_T\, \Phi_R$ $$\overline{\Phi}_M\, \overline{I_{ac}} = (J\Phi_R/K_T\, I_R)\,(d\overline{\omega}/dt) \tag{11}$$

Expressing the rotational speed $\omega$ in terms of a linear velocity V and diameter D $$\omega = V/\pi D \tag{12}$$

$$\overline{\omega} = \overline{V}\,(1/D) \tag{13}$$

$$d\overline{\omega}/dt = (1/D)\,(d\overline{v}/dt) \tag{14}$$

Substituting 14 in equation 11

$$\overline{\Phi}_M\, \overline{I_{ac}} = (J\omega_R/K_T I_R)\,(1/D)\,(d\overline{V}/dt) \tag{15}$$

With a counter emf(CEMF) regulator on the motor field, $$\overline{\Phi}_M = \overline{D}$$

Expressing rated motor speed in RPM as a function of rated speed $V_R$ $$\omega_R = (V_R/K'_V)\,\Phi_R \tag{16}$$

$$\omega_R = V_R/K_V \text{ where } K_v = K'_v\, \Phi_R \tag{17}$$

Substituting these expressions in Eq. 15 and solving $Iac$ $$I_{ac} = (JV_R/K_T K_V\, I_R)\,(1/D)\,(d\overline{v}/dt) \tag{18}$$

$$\overline{I_{ac}} = Z(1/D)\, d\overline{v}/dt \quad \text{Eq. (5)} \tag{19}$$

where $$Z = JV_{R/KT}K_V I_R$$

$$d\bar{V}/dt = \text{line acceleration rate}$$

Assuming a line with a constant acceleration rate, then $d\bar{V}/dt = 1/T_A$ where $T_A$ is the acceleration time in seconds to reach rated speed $V_R$.

Substituting the expression $d\bar{V}/dt = 1/T_A$ in Eq. 19 gives the following expression for the normalized value of accelerating current Iac:

$$\overline{I_{ac}} = (Z/T_A)\,(1/\mathrm{D}^2) \quad (20)$$

Defining Z as a normalized constant where $\bar{Z} = Z/T_A$, Eq. 20 becomes $$I_{ac} = \bar{Z}\,(1/\bar{\mathrm{D}}^2) \quad (21)$$

Since Z depends upon the inertia of the coil, motor, and associated mechanical system, it can be described as a sum of several time constants.

$$Z = JV_R/K_T K_V I_R \quad (22)$$

$$Z = [(WK^2/32.2)\,VR] \quad (23)$$

$$Z = [WK^2\,N_R\,\mathrm{N}_R\,(2\,\pi)]/[(32.2)\,(5250)HP_R\,(60)] \quad (24)$$

$$\mathrm{Z} = 0.615\,(N_R/1000)^2\,(WK^2/HP_R) \quad (25)$$

$$Z = (0.615/HP_R)\,(N_R/1000)^2\,[W_M + W_c + W_s] \quad (26)$$

where $N_R$ = rated motor speed at full field (in RPM)

$HP_R$ = rated motor horsepower $W_M$ = gear and motor inertia referred to the motor shaft $W_c$ = mandrel inertia referred to the motor shaft $W_s$ = strip (coil) inertia referred to the motor shaft The following are true by definition $$\bar{\mathrm{Z}}_M = (0.615/\mathrm{HP}_R)\,(\mathrm{N}_R/1000)^2\,(W_M/T_A) \quad (27)$$

$$\bar{\mathrm{Z}}_c = (0.615/\mathrm{HP}_R)\,(N_R/1000)^2\,(W_c/\mathrm{T}_A) \quad (28)$$

$$\bar{\mathrm{Z}}_S = (0.615/\mathrm{HP}_R)\,(N_R/1000)^2\,(W_s/T_A) \quad (29)$$

Substituting in Eq. 21:

$$\overline{I_{ac}} = (\bar{Z}_M + \bar{Z}_c + \bar{Z}_s)\,(1/\bar{\mathrm{D}}^2) \quad (30)$$

The inertia of the strip $\mathrm{W}_s$ can be expressed as a function of coil diameter D $$W_s = \rho_s L_s\,(\pi/32)\,(D^4 - \mathrm{D}_c^4) \quad (31)$$

$$W_s = \rho_s L_s\,(\pi/32)\,D_R^4\,(\bar{D}^4 - \bar{D}c^4) \quad (32)$$

where $\rho_s$ = strip density in lbs/cu ft $L_s$ = strip width in ft $D$ = coil diameter in ft $D_R$ = maximum coil diameter in ft $D_c$ = mandrel diameter in ft Substituting equation 32 in equation 30:

$$\overline{\mathrm{I}_{ac}} = (\bar{\mathrm{Z}}_M + \bar{\mathrm{Z}}_c)\,(1/\bar{\mathrm{D}}^2) + \bar{\mathrm{Z}}_1\,(\bar{\mathrm{D}}^2 - [\bar{\mathrm{D}}_c^4/\bar{\mathrm{D}}^2]) \quad (33)$$

where $$Z_1 = (1/T_A)\,(0.615/HP_R)\,(N_R/1{,}000)^2\,(\pi/32)\,\rho_s L_s D_R^4\,(1/GR)^2$$

The final equation then becomes $$\overline{I_{ac}} = \bar{Z}_1\bar{D}^2 + (\bar{Z}_M + \bar{Z}_c - \bar{Z}_1\,\bar{\mathrm{D}}_c^4)\,(1/\bar{\mathrm{D}}^2) \quad (34)$$

with $$\bar{Z}_M = (0.615/HP_R)\,(N_R/1000)^2\,(W_M/T_A)$$

$$\bar{Z}c = (0.615/HP_R)\,(N_R/1000)^2\,(1/T_A)\,(\pi/32)\,\rho_c L_c D_c^4\,(1/\mathrm{GR})^2$$

$$\bar{Z}_1 = (0.615/HP_R)\,(\mathrm{N}_R/1000)^2\,(1/\mathrm{T}_A)\,(\pi/32)\,\rho_s L_s D_R^4\,(1/\mathrm{GR})^2$$

Since the coefficients of the terms $D^2$ and $1/D^2$ are constants, Equation 34 has the general form:

$$\overline{I_{ac}} = \alpha_2\,(\alpha_1\,K_1\bar{D}^2 + [1/\bar{\mathrm{D}}^2]) \quad (35)$$

The signal may be broken into $$\overline{I_{ac}}\ (\text{in volts}) = \overline{Iac_1} + \overline{Iac_2} \quad (36)$$

$$\overline{I_{ac1}} = \alpha_1\,\alpha_2\,K_1 D \quad (37)$$

$$\overline{\mathrm{I}_{ac2}} = \alpha_2/\mathrm{D}^2 \quad (38)$$

The static function generator 14 for realizing equation (35) is shown in FIG. 1. A simplified equivalent circuit for the FIG. 1 embodiment is shown in FIG. 1.

The function generator 14 comprises four operational amplifiers indicated generally at 26, 28, 30 and 32 respectively. Amplifier 28 shapes the $\bar{D}^2$ function, while amplifier 30 produces the $1/\bar{D}^2$ function. Amplifiers 26 and 32 function as inverter and summer respectively.

The input $\bar{\mathrm{D}}$ from the CEMF regulator 20 is applied at 34 to amplifier 28 and to the inverter 26 either at input terminal 36 or input terminal 38. The inverted output from the inverter 26 is taken from output terminal 40 and applied to input terminal 42 or input terminal 44 of the $1/\bar{D}^2$ function generator 30.

Figure 3A:
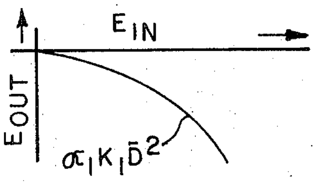
FIGS. 3A–3F are various curves used in explaining the operation of the circuitry of FIGS. 1 and 2.

Through the use of a biasing and diode network 46, the input resistance of the amplifier 28 is reduced at calculated voltage levels of $\bar{D}$, thereby increasing the gain of amplifier 28 in such manner as to produce a $\bar{D}^2$ output function, with a polarity reversal resulting from the amplifier characteristics. The output of the $\overline{D}^2$ function generator 28 is $-\alpha_1 K_1 \overline{D}^2$ and is depicted in FIG. 3A. (The gain K1 is obtained by means of the setting of potentiometer 1P.)

Figure 3B:
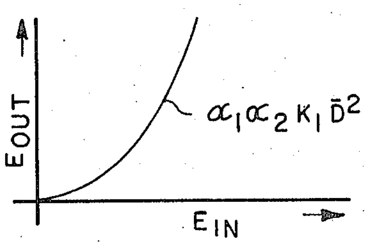

The output of the $\overline{D}^2$ function generator 28 is taken from output terminal 48 and applied to the summer 32 through jumpers $J_1$ or $J_2$ or $J_3$, only one of which will be connected in the practical embodiment the choice depending on various parameters. (As will be explained later, the width adjustment potentiometer 50 is used in some applications where the width of the material produces a significant effect on the drive inertia.) Similarly, either jumper $J_4$ or jumper $J_5$ will be connected to provide the desired output at terminal 52. After passing through the summer 32 the component signal Iac1 will appear as shown in FIG. 3B.

Figure 3C:
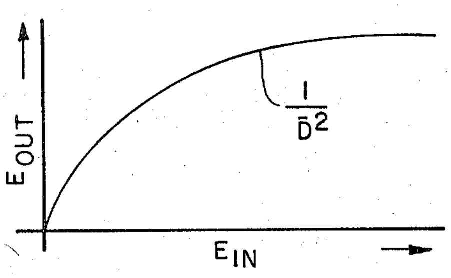
Figure 3D:
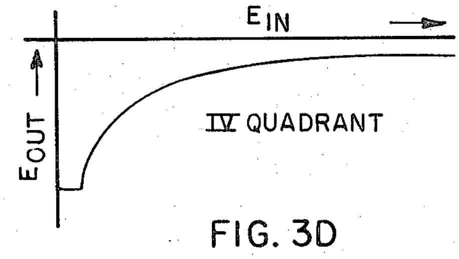
Figure 3E:
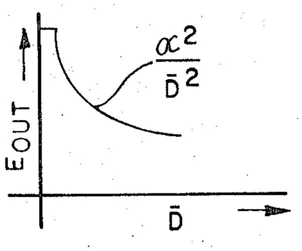
Figure 3F:
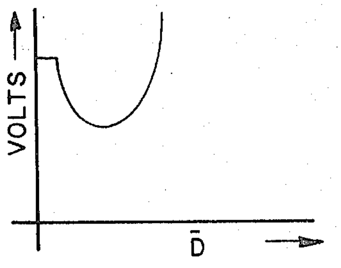

The $1/\overline{D}^2$ function is produced by means of the biasing and diode network 54 in the feedback path of amplifier 30. The feedback resistance decreases as the $\overline{D}$ signal increases, thereby lowering the gain of amplifier 30 to produce the output voltage shown in FIG. 3C. This signal is applied to amplifier 32 along with a negative signal PSN of about 24 v which causes the amplified output of amplifier 30 to be shifted into the fourth (IV) quadrant as shown in FIG. 3D. The output of the summing amplifier 32 due to the component $Iac2$ i.e. $\alpha^2/\overline{D}^2$ and is depicted in FIG. 3E. When the amplifier 32 sums $Iac1 + Iac2$ (FIGS. 3B and 3E) the result is the output signal shown in FIG. 3F.

The practical example to follow will serve to demonstrate the utility and universality of the invention.

As a result of component limitations, the normalized diameter range of the generator extends from $0.25 \leq 24\ D \leq 1.0$. Also the amount of compensation current available depends upon the magnitude of the voltage signal corresponding to rated current. Since the integrated circuit amplifiers saturate at 10V, the voltage signal for rated current should be less than 10V — how much less depends upon the percentage of compensation current desired. For example, if 4V is chosen as rated current then there will be 250 percent of rated current available for inertia compensation.

The current reference signal needed can be computed from the normalized equation 34.

The data required for use in the above equation is as follows:

| | | |
|---|---|---|
| Machine rating ($HP_R$) | | HP |
| Gear-in-speed ($N_R$) | | RPM |
| Motor inertia ($W_M$) | | No. FT² |
| Coil weight (at max. W diameter and width ST) | | No. |
| Diameter of coil ($D_R$) | | FT |
| Acceleration time ($T_A$) | | SEC |
| Gear Ratio ($G_R$) | NR/N load | |
| Normalized mandrel diameter ($\overline{D}_c$)=$Dc/D_R$= | | |

The above magnitudes for inertia are referred to the motor shaft. Also in calculating $Z_1$, $[W_{ST}D_R^2]/[8(1-\overline{D}_C^2)G_R^2]$ can be replaced by the inertia of the strip material depending upon the information available.

Assuming the following data, a sample calculation would be

| | | |
|---|---|---|
| Machine rating ($HP_R$) | 125 | HP |
| Gear-in-speed ($N_R$) | 930 | RPM |
| Motor inertia ($W_M$) | 134 | No. FT² |
| Mandrel inertia ($W_c$) | 304 | No. FT² |
| Strip inertia $W_{ST}D_R^2/8(1-Dc^2)\ GR^2$ | 12,600 | No. FT² |
| Acceleration time ($T_A$) | 10 | SEC |
| Normalized mandrel diameter (Dc) | 0.375 | |

$\overline{Z}_M = 0.057$
$\overline{Z}_1 = 0.2075$
$\overline{Z}_c = 0.005$

The calculated values of $\overline{Z}_M$, $\overline{Z}_1$ and $\overline{Z}_c$ are then used in Eq. 34 to calculate the normalized value of current needed as a function of diameter.

$$\overline{Iac} = \overline{Z}_1 D^2 + (\overline{Z}_m + \overline{Z}_c - \overline{Z}_1\ \overline{D}_c^4)\ (1/\overline{D}^2) \quad (39)$$

$$\overline{Iac} = 0.2075\ \overline{D}^2 + 0.057 + [0.005 - (2075)\ (0.02)]\ (1/\overline{D}^2) \quad (40)$$

$$\overline{Iac} = 0.2075\ \overline{D}^2 + 0.058\ (1/\overline{D}^2) \quad (41)$$

The inertia compensation function generator of FIG. 1 has a transfer function of the form:

$$Vo = 0.715\ \alpha_2\ ([1/\overline{D}^2] + 1.4\ \alpha_1 K_1 \overline{D}^2)\ \text{volts} \quad (42)$$

where $D$ equals 1 at maximum diameter, and $D$ = [Input to function generator (Volts)]/[10 (Volts)]

Rearranging equation (41) to have form of equation (42)

$$\overline{Iac} = 0.058\ ([1/D^2] + 3.58\overline{D}^2) \quad (43)$$

Assuming 4 Volts/Unit $I_R$, the voltage signal would be $$\overline{I}_{ac} = (\text{Volts}) = 0.232\ ([1/\overline{D}^2] + 3.58\overline{D}^2) \quad (44)$$

Comparing corresponding coefficients in equations (42) and (44) the magnitudes for $\alpha_2$ and $\alpha_1$ $K_1$ can be calculated.

$0.715\ \alpha_2 = 0.232$
$\alpha_2 = 0.324$
$1.4\ \alpha_1 K_1 = 3.58$
$\alpha_1 K_1 = 25.6$ $\alpha_1 K_1$ has a range of $1.21 \leq \alpha_1 K_1 \leq 308$ depending upon which input is used at summer 32.

$\alpha_2$ has a range of $0.0383 \leq \alpha_2 \leq 1.045$ depending upon whether jumper (J4 or J5) is used.

Figure 5:
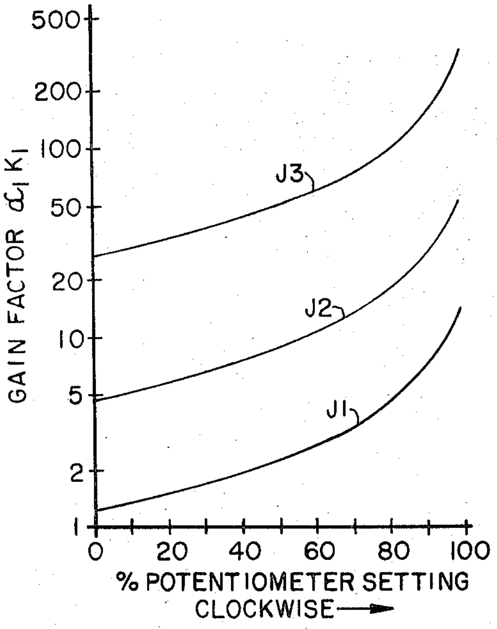
FIG. 5 is a graph of gain factor $\alpha_1 K_1$ VS% potentiometer setting (1P) used in explaining one practical example.
Figure 6:
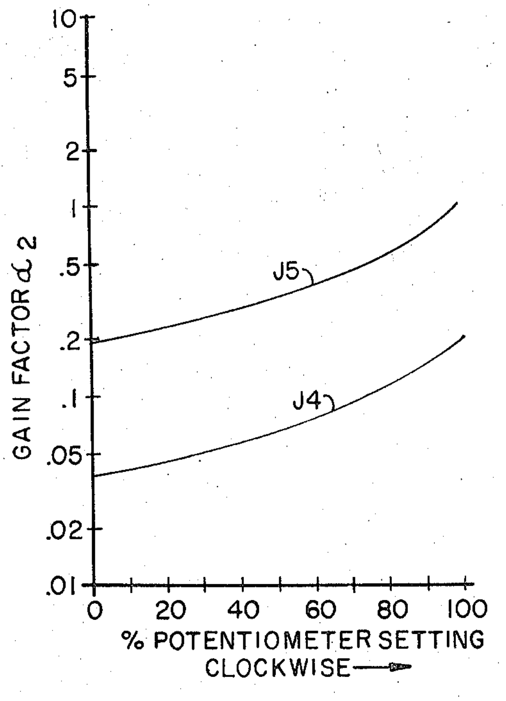
FIG. 6 is a graph of gain factor $\alpha_2$ VS% potentiometer setting (2P) also used in explaining the practical example.

Using the calculated values in conjunction with the amplifier characteristics plotted in FIG. 5, pot and jumper settings for the generator can be obtained. Referring to FIG. 5 and using $\alpha_1 K_1 = 25.6$, jumper J2 is used with a pot setting on P1 of 89% CW. For an $\alpha_2$ of 0.324, jumper J5 is used with a pot setting of 49% CW.

Thus the total startup procedure required necessitates only the connection of the appropriate jumpers and making the calculated pot settings.

In order to make modifications in the field, the external pots P1 and P2 can be used to adjust the total curve. The individual $\overline{D}^2$ and $1/\overline{D}^2$ curves also may be isolated and adjusted independently to suit the application.

STRIP WIDTH ADJUSTMENT

For applications where width of the strip material has a significant effect on the inertia of the drive, an adjustment potentiometer 50 is added to the $D^2$ function generator 28 as shown in FIG. 1. The adjustment of this potentiometer 50 should be normalized such that full output is connected to amplifier 32 for maximum strip width.

What is claimed is:

1. In a constant tension control system for a d.c. drive motor operating to wind or unwind a reel of material, a static inertia compensation function generator for supplying inertial compensation signals Iac for varying the speed of said motor for maintaining constant tension on said material under accelerating or decelerating load conditions comprising:

a. means for generating a signal $\bar{D}$ which is a function of the normalized instantaneous diameter of said reel;

b. means for receiving said signal $\bar{D}$ and for generating signal $-\alpha_1 K_1 \bar{D}^2$ which is a function of the square of said normalized instantaneous diameter, $\alpha_1$ and $K_1$ being gain constants;

c. means for receiving said signal $\bar{D}$ and for delivering an inverted normalized instantaneous diameter signal $-\bar{D}$;

d. means for receiving said inverted signal $-\bar{D}$ and for delivering a signal $1/\bar{D}^2$ which is a function of the reciprocal of the normalized instantaneous diameter squared;

e. means for receiving said signal $-\alpha_1 K_1 \bar{D}^2$ and $1/\bar{D}^2$ respectively, for amplification and summation and for delivering said inertial compensation signal $Iac = \alpha_2 (\alpha_1 K_1 \bar{D}^2 + 1/\bar{D}^2)$ where $\alpha_2$ is the gain of said amplifier summation means.

2. A static inertial compensation function generator according to claim 1 wherein:

said $\bar{D}^2$ function generating means comprises an operational amplifier having an input resistance which non-linearly decreases as $D$ increases.

3. A static inertia compensation function generator according to claim 1 wherein:

said $1/\bar{D}^2$ function generating means comprises an operational amplifier having a feedback path between output and input, the resistance of said path decreasing non-linearly as $\bar{D}$ increases.

4. A static inertia compensation function generator according to claim 1 wherein:

said amplifying summation means comprises an operational amplifier having three inputs, a feedback path and an output, said inputs receiving a signal of fixed polarity, and said $\alpha_1 K_1 \bar{D}^2$ and $1/\bar{D}^2$ signals respectively, said feedback path being connected to provide a fractional part $\alpha_2$ of said output to said inputs.

* * * * *